(12) United States Patent
Scott

(10) Patent No.: US 10,549,301 B2
(45) Date of Patent: Feb. 4, 2020

(54) SYSTEM AND METHOD FOR MONITORING AND IMPROVING OPERATION OF SPRAY TOOL

(71) Applicant: Carlisle Fluid Technologies, Inc., Scottsdale, AZ (US)

(72) Inventor: Charles John Scott, Phoenix, AZ (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 122 days.

(21) Appl. No.: 15/444,011

(22) Filed: Feb. 27, 2017

(65) Prior Publication Data
US 2017/0259288 A1 Sep. 14, 2017

Related U.S. Application Data

(60) Provisional application No. 62/305,507, filed on Mar. 8, 2016.

(51) Int. Cl.
*B05B 12/00* (2018.01)
*G05B 19/04* (2006.01)
(Continued)

(52) U.S. Cl.
CPC .......... *B05B 12/008* (2013.01); *B05B 12/002* (2013.01); *G05B 19/041* (2013.01);
(Continued)

(58) Field of Classification Search
CPC ... B05B 12/002; B05B 12/008; B05B 12/124; G05B 19/041; G05B 19/048;
(Continued)

(56) References Cited

U.S. PATENT DOCUMENTS 5,591,299 A * 1/1997 Seaton ............. G05B 19/41865
700/121
5,757,498 A 5/1998 Klein, II et al.
(Continued)

FOREIGN PATENT DOCUMENTS

JP 2004066343 A 3/2004
JP 2009099100 A 5/2009
(Continued)

OTHER PUBLICATIONS

"Competitive Edge through Industrial Identification," SIMATIC Ident, Automation, Apr. 2010, Siemens AG 2010, 4pgs, https://www.siemens.com/press/pool/de/materials/industry/iia/2011-02-simatic-ident/article-industrial-identification-e.pdt.
(Continued)

*Primary Examiner* — Chun Cao
(74) *Attorney, Agent, or Firm* — Fletcher Yoder, P.C.

(57) ABSTRACT

A system includes a manual tool data system having a manual tool data monitoring system configured to monitor one or more manual tools, a manual tool data acquisition system configured to acquire data corresponding to one or more operational parameters of the one or more manual tools, a manual tool data analysis system configured to analyze the data acquired by the manual tool data acquisition system, and a manual tool messaging system configured to generate messages based on the data analyzed by the manual tool data analysis system.

25 Claims, 4 Drawing Sheets

(51) Int. Cl.
*G05B 19/048* (2006.01)
*G05D 7/06* (2006.01)
*B05B 12/12* (2006.01)

(52) U.S. Cl.
CPC ......... *G05B 19/048* (2013.01); *G05D 7/0617* (2013.01); *B05B 12/124* (2013.01); *G05B 2219/24015* (2013.01)

(58) Field of Classification Search
CPC ........ G05B 19/41855; G05B 19/41875; G05B 2219/24015; G05B 2219/31027; G05B 2219/45013; G05D 7/0617
USPC ....................................................... 700/160
See application file for complete search history.

(56) References Cited

U.S. PATENT DOCUMENTS

| | | | |
|---|---|---|---|
| 2013/0048318 A1* | 2/2013 | Ewers | A62C 5/02 |
| | | | 169/46 |
| 2013/0138606 A1 | 5/2013 | Kahle et al. | |
| 2016/0228901 A1* | 8/2016 | Hooper | B05B 12/008 |
| 2017/0252771 A1* | 9/2017 | Young, II | B05C 5/0225 |

FOREIGN PATENT DOCUMENTS

| | | |
|---|---|---|
| JP | 2013151043 A | 8/2013 |
| JP | 2014018712 A | 2/2014 |
| JP | 2015208822 A | 11/2015 |
| WO | 2011129948 A1 | 10/2011 |

OTHER PUBLICATIONS

PCT International Search Report & Written Opinion for PCT Application No. PCT/US2017/020174 dated Jul. 13, 2017, 25 pgs.
Japanese Office Action for JP Application No. 2018-547481 dated Nov. 5, 2019, 4 pgs.

\* cited by examiner

SYSTEM AND METHOD FOR MONITORING AND IMPROVING OPERATION OF SPRAY TOOL

CROSS REFERENCE TO RELATED APPLICATION

This application claims priority to and benefit of U.S. Provisional Patent Application No. 62/305,507, entitled "SYSTEM AND METHOD FOR MONITORING AND IMPROVING OPERATION OF SPRAY TOOL," filed Mar. 8, 2016, which is herein incorporated by reference in its entirety.

BACKGROUND

The present disclosure relates generally to manual tools, such as user operated spray tools, used in service shops or other facilities.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Service shops, such as paint shops or spray service shops, may employ a number of processes and spray tool operators working simultaneously to accomplish jobs for customers. In many instances, processes being done by different operators may involve levels of techniques and expertise that may only be learned through experience, but there is little operator to operator communication to pass down this valuable knowledge. The lack of communication may result in inconsistent quality, inconsistent use of raw materials, inconsistent cost per job or operator, and lost opportunities in training and improvements. In many instances, it is also difficult to communicate techniques and expertise in quantified terms during operation. Furthermore, as multiple tools (e.g., spray tools) may be used simultaneously by a number of operators, it is cumbersome and difficult to track their condition and need for service or maintenance.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a manual tool data system having a manual tool data monitoring system configured to monitor one or more manual tools, a manual tool data acquisition system configured to acquire data corresponding to one or more operational parameters of the one or more manual tools, a manual tool data analysis system configured to analyze the data acquired by the manual tool data acquisition system, and a manual tool messaging system configured to generate messages based on the data analyzed by the manual tool data analysis system.

In another embodiment, a system includes a spray tool having at least one passage coupled to a spray applicator and at least one manual input configured to control operation of the spray tool, a sensor coupled to the spray tool, and communications circuitry coupled to the sensor.

In another embodiment, a method includes monitoring one or more manual tools with a manual tool data monitoring system, acquiring data corresponding to one or more operational parameters of the one or more manual tools with a manual tool data acquisition system, analyzing the data acquired by the manual tool data acquisition system with a manual tool data analysis system, and generating messages based on the data analyzed by the manual tool data analysis system via a manual tool messaging system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

DETAILED DESCRIPTION

Figure 1:
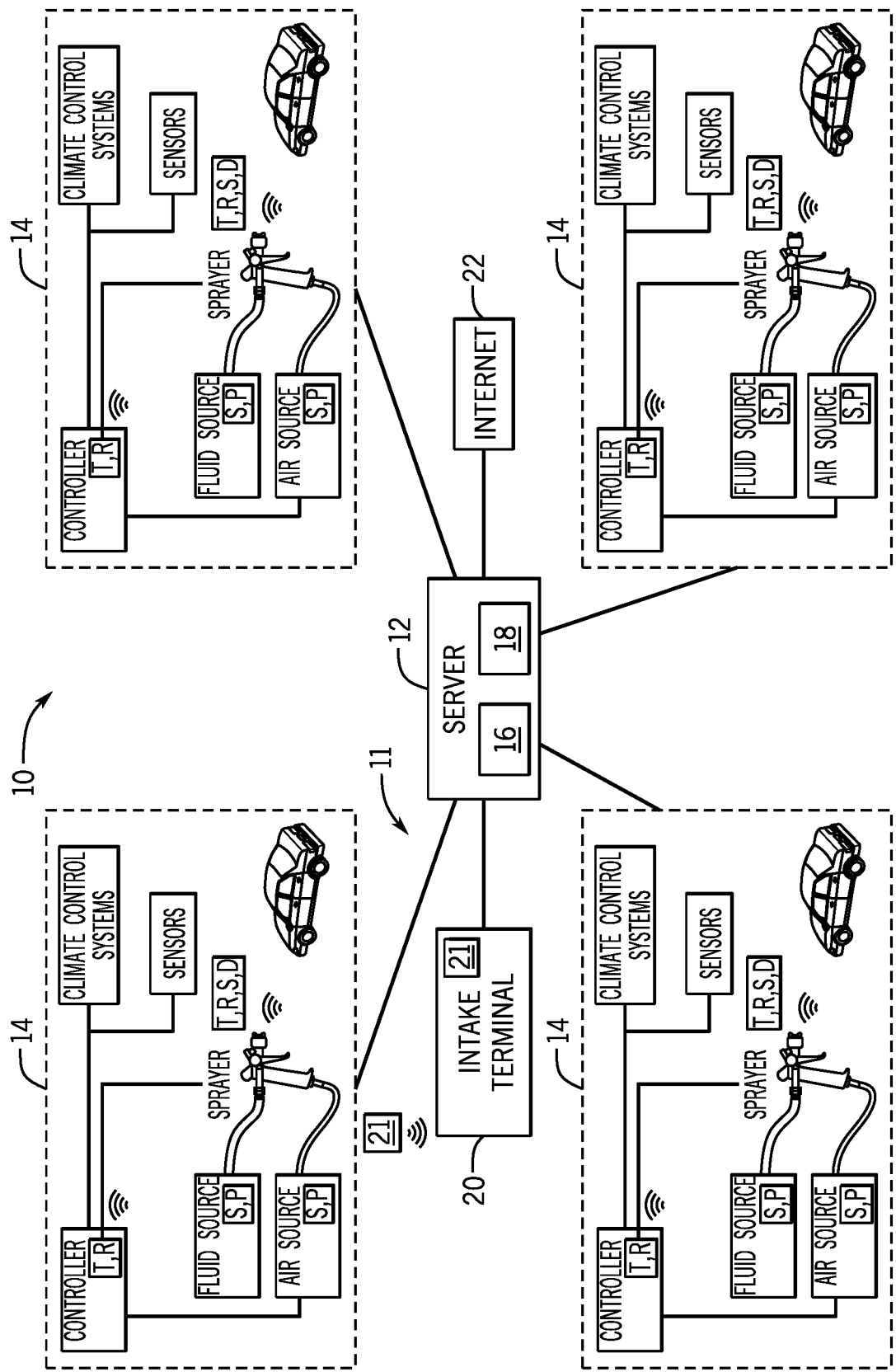
FIG. 1 is a block diagram of an embodiment of a process communication system having a plurality of spraying systems connected via a centralized server.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, the disclosed embodiments include systems and methods to monitor various parameters of tools (e.g., manual tools operated by a human operator), collect the monitored data as inputs (e.g., sensor feedback and/or operator input), analyze the collected data, and provide outputs. The disclosed embodiments may use a network, such as a wired network and/or wireless network, having a central server or computing device that communicates information to and from the various tools, the operators of the tools, and other personnel at the facility or remote from the facility. The disclosed embodiments may perform the monitoring, data collection, data analysis, and/or generation of outputs in real-time or substantially real-time, continuously or substantially continuously, with a high sampling rate (e.g., data acquired at intervals of less than or equal to 0.1, 0.5, 1, 2, 3, 4, 5, 6, 7, 8, 9, or 10 seconds), or any combination thereof. In some embodiments, the data analysis and/or generation of outputs may be performed at a later time, with a set time delay (e.g., 1, 2, 3, 4, 5, 10, 15, 20, or 30 minute delay), in a periodic manner (e.g., hourly, daily, weekly, monthly, and/or yearly), or any combination thereof. In general, the disclosed embodiments may facilitate improved usage of the tools, improved usage of raw materials, improved sharing of knowledge and experience among operators, reduced costs and increased profitability, and improved operator efficiency, performance, and quality, among other things.

In the following discussion of FIGS. 1-5, reference is made to spraying systems and spray tools for purposes of illustration; however, the disclosed embodiments may be used with any type of tools (e.g., manual tools). The manual tools may include handheld and/or portable tools, such as electric tools (e.g., electric motor driven tools), pneumatic tools (e.g., pneumatic operated tools), hydraulic tools (e.g., hydraulically driven tools), or any combination thereof. The manual tools may be configured to remove materials (e.g., cutting, abrading, melting, etc.), add materials (e.g., spraying, coating, etc.), or alter materials of a target object (e.g., a worked upon component). For example, the manual tools may include coating applicators such as spray tools, drills, torque tools, impact wrenches, cutting tools (e.g., miter saws, table saws, circular saws, reciprocating saws, jig saws, and/or routers), or any combination thereof. The spray tools may include a powder coat spray tool (e.g., applies powder coating material), a liquid coat spray tool (e.g., applies a liquid coating material), an electrostatic spray tool, a rotary atomizer spray tool (e.g., a rotary bell cup spray tool), an airless or hydraulic atomizer spray tool (e.g., atomizes coating material without a gas), an air-assisted or pneumatic atomizer spray tool (e.g., atomizes coating material with assistance of a gas such as air), a gravity fed spray tool (e.g., with a gravity feed container disposed above and coupled to the spray tool), a siphon feed spray tool (e.g., with a siphon feed container disposed below and coupled to the spray tool), or any combination thereof. For example, the coating material may include clear coat material, colored paints, or other surface finish materials. In some embodiments, the manual tool may include a material applicator or spray tool that applies an adhesive, a foam material, a sealant, an epoxy or multi-component material, a plastic, an elastomer or rubber, a plasma, a flame, or any combination thereof. The spray tool also may be used to apply chemicals or other fluids. Each of these tools may include a number of manual inputs (e.g., one or more triggers, buttons, switches, knobs, dials, or user interfaces) that may be monitored by the system described in detail below. Each of these tools also may include various components (e.g., actuators, valves, drives, motors, fluid passages, tanks, electronics, etc.) that may be monitored by the system described in detail below. However, for purposes of discussion, the system is described below in context of spray systems and spray tools, yet everything described herein is applicable to any of the foregoing tools.

The monitored or tracked data may include any operating parameter of the tools, such as fluid flow parameters (e.g., flow rate, pressure, and/or velocity), material characteristics of raw materials (e.g., material composition, ratio of materials mixed together, viscosity, density, and/or temperature), electrical parameters (e.g., voltage, current, and/or grounding), tool characteristics (e.g., specifications, model number, serial number, and/or other unique identifier), supporting or auxiliary equipment information (e.g., specifications, model number, serial number, and/or other unique identifier), positional information of tool (e.g., relative position, movement, direction of movement, acceleration, and/or any changes thereof), characteristics of powered components, motors, or drives of the tool (e.g., rotational speed, rotational acceleration or deceleration, torque, linear speed, linear acceleration or deceleration, operational settings such as high, medium or low, etc.), operational usage of the tool (e.g., specific operator using the tool, tool settings during use, duration of usage time, timestamp of specific times of use, frequency of use, and/or number of actuations of controls such as triggers, buttons, or switches), or any combination thereof. The monitored or tracked data also may include operator information about the operator using the tool, e.g., operator name, identification number or other unique identifier, age, years of experience, years of employment, professional certifications, professional training, educational degrees, or other operator information. The operator information may be input by the operator and/or retrieved from a database based on an input operator identifier, e.g., by typing in the operator identifier, using a scanner or reader for scanning the operator identifier (e.g., bar code, radio frequency identification [RFID] tag, smart tag, etc.), or any combination thereof. For example, the operator identifier may be disposed on an employee identification card, a driver's license, or the like. Upon inputting the operator's identification, all other operator information may be correlated to the operation of the tool by the particular operator. The monitored or tracked data also may include information about a target object (e.g., a component to be worked upon), such as a part number, model number, specifications, or other unique identifier. The target object data may be input by the operator and/or retrieved from a database based on an input identifier, e.g., by typing in the identifier, scanning the identifier (e.g., bar code, radio frequency identification [RFID] tag, smart tag, etc.), or any combination thereof. Upon inputting the identifier, all other information for the target object may be correlated to the operation of the tool by the particular operator. The monitored data also may include environmental conditions, such as temperature, pressure, humidity, wind speed, air quality, pollutant levels (e.g., smoke, $CO_2$, particulate matter such as dust or paint, etc.) in the air, or any combination thereof. Each of the foregoing monitored data may relate to any one or more types of tools, as described above. However, for purposes of discussion, the system is described below in context of spray systems and spray tools, yet everything described herein is applicable to any of the foregoing tools.

As noted above, the monitored and collected data may be processed and analyzed in a variety of ways. For example, the disclosed embodiments may analyze and compare the data between different operators, different tools, different parts or components being worked upon, different environmental conditions, different operational settings of the tools and associated equipment, different working materials, or any of a variety of parameters. The disclosed embodiments may analyze the data and compare the data against baseline data, thresholds (e.g., upper and lower thresholds), computer models, knowledge based data, specific criteria for efficient operation of the tool, specific criteria for efficient performance of a particular task or job, or any combination thereof. The disclosed embodiments may analyze the data and identify trends or differences between operators with greater or lesser experience levels; operators with greater or lesser efficiencies, quality output, or performance; operators with greater or lesser costs or profits per time period, per task, or per worked upon part; operators with greater or lesser training, certifications, or education; and/or operators with other differences that could attribute to differences in the data. In this manner, the disclosed embodiments may help to identify appropriate outputs to the operators, managers and other personnel, the tools and associated equipment, and so forth.

The outputs may include a variety of physical or electronic outputs, such as reports, alarms, alerts, service or maintenance recommendations, operator improvement messages, control signals to change one or more operating parameters of the tools and associated equipment, or any combination thereof. For example, the outputs may be provided in real-time, during operation of the spray tool, or after completion of a particular task. The outputs may electronically or physically provided to the operator to help improve efficiency, performance, and quality; reduce costs; reduce excessive use of raw materials; correct any improper or imperfect use of the tools; and correct any improper or imperfect implementation of a particular task. For example, the disclosed embodiments may sent an alert, alarm, or message to an operator of a tool that the tool is moving too fast or too slow, the tool is using too much or too little raw material, the tool is positioned too far away from or too close to a target object, the tool is using raw materials with an incorrect composition or ratio (e.g., hardener to resin ratio, gas to liquid ratio, gas to solids ratio, etc.), and so forth. As appreciated, the outputs may vary depending on the type of tool, task or project, raw materials, and other parameters. However, for purposes of discussion, the system is described below in context of spray systems and spray tools, yet everything described herein is applicable to any of the foregoing tools.

In certain embodiments described below with reference to FIGS. 1-5, the systems and methods may be used within a service shop (e.g., body shop, paint shop, etc.) to unify and control quality of the paint service and to provide feedback to the operators in the same shop or different shops. Each service shop may thus include a spraying system that communicates with various intra-shop systems (spray tool, paint mixer, climate control system, central component intake kiosk, etc.) to collect parameters, usage and other information about the spraying process. The spraying system may thus communicate via a centralized server to provide intra- and inter-shop connectivity. Furthermore, detailed spray tool operating parameters and conditions may be captured and analyzed to improve the quality and consistency of services provided by different operators, and to provide feedback to operators. Furthermore, the captured and analyzed information may be used for preventive maintenance. In the following discussion, the spraying system is introduced in context of a service shop for vehicle repair and service, yet the disclosed embodiments may be used in any service shop or facility with any suitable tools and equipment.

FIG. 1 is a block diagram of an embodiment of a process communication system 10, which may include all of the features introduced above and discussed further below. The process communication system 10 also may be described as, or include, a manual tool data system (e.g., a manual spray tool data system), a spray tool monitor system, a spray tool data acquisition system, a spray tool process control analysis and improvement system, a spray tool reporting system, and a spray tool operational management system. The process communication system 10 may be configured to monitor various parameters of tools (e.g., manual tools such as spray tools operated by a human operator), collect the monitored data as inputs (e.g., sensor feedback and/or operator input), analyze the collected data, and provide outputs.

The process communication system 10 includes one or more servers 12 that connect and/or communicate with one or more spraying systems 14, components, and subsystems of the process communication system 10 via a network or communications system 11 (e.g., wired and/or wireless network or communications system). Again, as discussed above, the spray systems 14 are merely an example of possible tool systems that may be used with the disclosed embodiments, and it should be understood that any tool systems may be used in the process communication system 10. The server 12 may include a processor 16 and data storage 18 to store and distribute the information monitored, collected, processed, and analyzed by spraying systems 14 of the process communication system 10. The processor 16 may provide the processing capability to execute the operating system, programs, user and application interfaces, and any other functions of the process communication system 10. The processor 16 may include one or more microprocessors, such as one or more "general-purpose" microprocessors, one or more special-purpose microprocessors or ASICS, or some combination of such processing components. For example, the processor 16 may include one or more reduced instruction set (RISC) processors, as well as graphics processors, video processors, audio processors, and the like. As will be appreciated, each spraying system 14 may be communicatively coupled to the server 12 for transferring data and instructions. The storage 18 may include volatile or non-volatile memory configured to store information collected by spraying systems 14, as well as information collected by spraying systems 14 and subsequently processed/analyzed by the processor 16, such as information relating to spray tool usage, actual and suggested operating conditions and parameters, and maintenance update. As will be appreciated, the server 12 may also be configured to interact with components or subsystems of the spraying systems 14.

In the illustrated embodiment, one or more servers 12 include hardware and/or software instructions including a manual tool data monitoring system, a manual tool data acquisition system, a manual tool data analysis system, a manual tool messaging system, and a manual tool control and/or override system. The manual tool data monitoring, acquisition, analysis, messaging, and control and/or override systems may be disposed on a common server or a plurality of different servers. The manual tool data monitoring system is configured to monitor various sensor feedback of the spraying systems 14, such as various operating parameters of a spray tool and associated equipment as described in further detail below. The manual tool data acquisition system is configured to acquire and store the data from the sensors. The manual tool data analysis system is configured to process and analyze the monitored and acquired data, and identify trends, problems, areas for operator improvement, areas for servicing or maintenance, deviations from baselines or thresholds, or any combination thereof. The manual tool messaging system is configured to generate various messages (e.g., alerts, alarms, recommended operational changes, advice, knowledge based data, etc.) to the operator of a spray tool. The manual tool control and/or override system is configured to supplement and/or replace the messages by the manual tool messaging system, and disable the spray tool or change operational parameters of the spray tool to improve quality and performance. In some embodiments, the manual tool control and/or override system may have limited control functions, given that the spray tool is generally operated with manual controls. However, the manual tool control and/or override system may be configured to disable a fluid supply system, a power source (e.g., electrical), and/or terminate flows by closing valves if the operator does not make any manual adjustments in response to the messages. In some embodiments, the spray tool may be configured to be overridden and controlled remotely in terms of certain parameters, such as flow rates, speed of rotation, etc., while the operator still manually moves the spray tool.

Each spraying system 14 is communicatively coupled to an intake terminal 20, which is communicatively coupled to the server 12, such that information relating to spray process may be communicated both ways via the intake terminal 20. In certain embodiments, the intake terminal 20 may be used to intake a product, part, project, customer, or any combination thereof, into the server 12 (e.g., a spray coating job, a vehicle identification number [VIN], etc.). In certain embodiments, the intake terminal 20 may include, couple to, or wirelessly communicate with a scanner or reader unit 21, which is configured to scan or read identification information on the part or product (e.g., a bar code, VIN, RFID tag, smart tag, etc.). The intake terminal 20 may include a computer located, for example, at a work area of the service shop or at a workshop location where spray tool operators may have convenient access. In some embodiments, the intake terminal 20 may include a personal electronic device (PED), such as a tablet computer, smartphone, laptop, etc. In addition to the intake terminal 20, the process communication system 10 may include an internet interface 22 (e.g., web portal or user interface) configured to download and upload information (e.g., the information processed by the spraying systems 14) from the internet (wired or wireless). For example, authorized personnel may obtain or input information via a web interface at any time. Additionally, information about suggested spray tool operating procedures, usage, conditions, maintenance updates, and other information about the spraying system and service may be communicated to authorized personnel through the internet interface 22. Furthermore, the intake terminal 20 may be any local-area network devices, which may be connected to the server 12 from within each service shop. The local-area network device may be a personal electronic devices (PEDs) that wirelessly connect to the server 12. Authorized personnel may use the PED to interact with the server 12 from anywhere within the service shop. For example, a paint technician/an operator may use the PED at any location within the service shop to look up information relating to operating condition and usage of spray tools for training, process improvement and preventive maintenance purposes.

Figure 2:
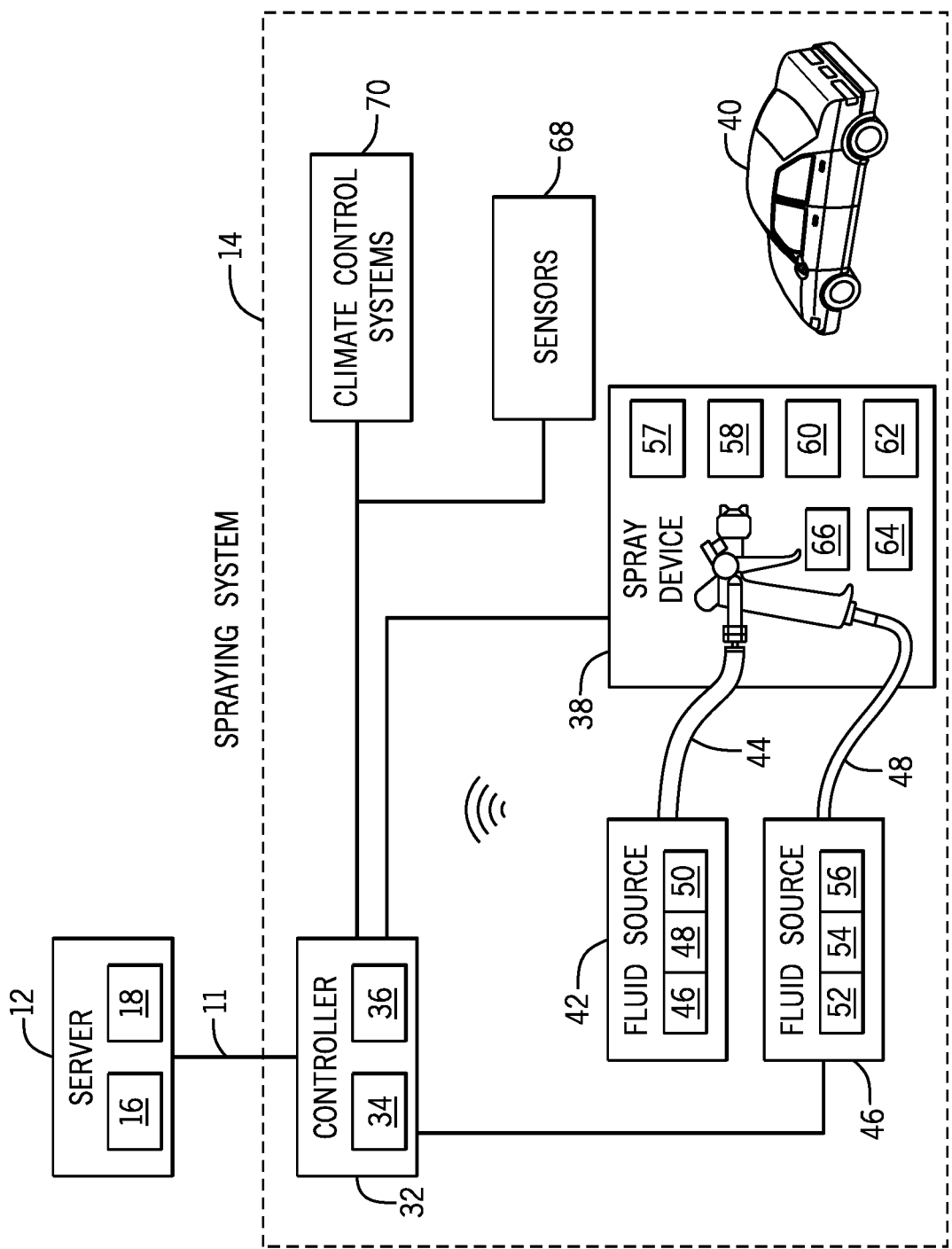
FIG. 2 is a block diagram of an embodiment of the process communication system of FIG. 1.

FIG. 2 is a block diagram of an embodiment of the spraying system 14 illustrated in FIG. 1. The spraying system 14 may be connected to the server 12 via a controller 32 that has a processor 34 and memory 36. The processor 34 may receive instructions from the server 12 and/or communicate with various components and subsystems of the spraying system 14 via a wired or wireless network or communications system 11. The server 12 and the controller 32 each include communications circuity, such as wired and/or wireless communication circuitry. The memory 36 may store information communicated by the server 12 and information collected by various components and subsystems of the spraying system 14.

The spraying system 14 includes at least one spray tool 38 configured to apply a spray of coating material onto an object 40 submitted for service (e.g., a vehicle). As discussed above, the spray tool 38 may include a powder coat spray tool (e.g., applies powder coating material), a liquid coat spray tool (e.g., applies a liquid coating material), an electrostatic spray tool, a rotary atomizer spray tool (e.g., a rotary bell cup spray tool), an airless or hydraulic atomizer spray tool (e.g., atomizes coating material without a gas), an air-assisted or pneumatic atomizer spray tool (e.g., atomizes coating material with assistance of a gas such as air), a gravity fed spray tool (e.g., with a gravity feed container disposed above and coupled to the spray tool), a siphon feed spray tool (e.g., with a siphon feed container disposed below and coupled to the spray tool), or any combination thereof. In some embodiments, the coating materials are premixed prior to fluidly coupling a fluid supply (e.g., container) to the spray tool 38. Furthermore, in some embodiments, the coating materials are mixed during operation of the spray tool 38, e.g., remote from the spray tool 38 or directly at the spray tool 38. Although the present discussion refers to fluids and paint, the spray system 14 may be configured to apply any suitable liquid material, powder material, foam, adhesive, sealant, hardener, lacquer, stain, wax, plasma, flame, or surface treatment.

In the illustrated embodiment, the spray tool 38 may be connected to a fluid source 42 (e.g., paint mixer and/or supply system) via a hose 44 and an air source 46 via a hose 48. The fluid source 42 may include one or more fluid supplies 46 (e.g., containers, tanks, pumps, valves, pressure regulators, flow controls, etc.), one or more communications circuits 48 (e.g., wired and/or wireless communications circuitry), and one or more sensors 50. The tanks may include a mixing tank with an agitator to facilitate mixing, and a plurality of supply tanks configured to supply different materials for mixing in the mixing tank. For example, the mixing tank may be configured to mix a hardener and a resin, a plurality of colors of paint, and/or any different materials in a desired ratio to achieve a desired composition of coating material. In a gravity feed spray tool 38, the tank may be coupled to a top portion of the spray tool 38, such that the coating material flows into the spray tool 38 via gravity. In a siphon feed spray tool 38, the tank may be coupled to a bottom portion of the spray tool 38, such that a vacuum created by an air flow suctions the coating material into the spray tool 38. In each of these configurations, the sensors 50 may be coupled to each component to monitor operational data and provide feedback to the controller 32, the server 12, and/or the spray tool 38. The sensors 50 may detect useful information, such as fluid flow parameters (e.g., flow rate, pressure, and/or velocity), material characteristics of raw materials (e.g., material composition, ratio of materials mixed together, viscosity, density, and/or temperature), fluid usage (e.g., volume, time, etc.), levels of materials in tanks, fluid flow problems, or any combination thereof, along with any other parameters disclosed herein. For example, the sensors 50 may detect a flow and/or ratio of different raw materials (e.g., different liquids, solids such as powders, resins, hardeners, colors, etc.). By further example, the sensors 50 may detect wear of components, noise and/or vibration indicating problems, drift in operational parameters, or any combination thereof.

Similarly, the air source 46 (or any other gas source) may include one or more air supplies 52 (e.g., compressed air tanks, containers, compressors, valves, pressure regulators, flow controls, etc.), one or more communications circuits 54 (e.g., wired and/or wireless communications circuitry), and one or more sensors 56. The sensors 56 may detect useful information, such as air flow parameters (e.g., flow rate, pressure, and/or velocity), air usage (e.g., volume, time, etc.), temperature, air flow problems, or any combination thereof, along with any other parameters disclosed herein. For example, the sensors 56 may detect wear of components, noise and/or vibration indicating problems, drift in operational parameters, or any combination thereof.

Finally, the spray tool 38 may include one or more scanners or readers 57, one or more manual inputs or controls 58, one or more spray mechanisms or applicators 60, one or more communications circuits 62 (e.g., wired and/or wireless communications circuitry), one or more sensors 64, and one or more user perceivable outputs 66. The scanners or readers 57 may include an optical reader, a camera, a RFID reader, a smart tag reader, a bar code scanner, or any other suitable scanner or reader used to acquire information from a part. For example, the scanner or reader 57 may supplement or replace the scanner 21 discussed above. The scanner or reader 57 may be used to identify a part or product prior to starting a spray coating task, such that the collected and analyzed data can be correlated to the particular part or product.

The manual inputs or controls 58 may include a flow control actuator or trigger, which may be configured to open and close one or more valves to enable and disable flow of fluids to a spray applicator. The valves may include a liquid flow valve, a powder flow valve, and one or more gas flow valves (e.g., a shaping air valve and an atomizing air valve). These valves may be simultaneously or sequentially opened and closed by the actuator or trigger, thereby generating a spray at the spray applicator. The manual inputs or controls 58 also may include one or more valve adjusters, such as an atomizing air valve adjuster for the atomizing air valve, a shaping air valve adjuster for the shaping air valve, and a fluid valve adjuster for a fluid valve (e.g., liquid or powder coating material). These valve adjusters enable the operator to manually adjust the ratio of different flows passing through the spray tool 38, e.g., a ratio of atomizing air flow to coating material flow, a ratio of shaping air flow to coating material flow, and a ratio of atomizing air flow to shaping air flow. The manual inputs or controls 58 also may include a speed adjuster for a rotary atomizer (e.g., rotary bell cup), a voltage adjuster for an electrostatic assembly of an electrostatic spray tool 38, or any other operational control. The spray applicator 60 may include a rotary atomizer (e.g., rotary bell cup), an airless or hydraulic atomizer, an air assisted or pneumatic atomizer (e.g., with air atomizing jets and/or air shaping jets), or any combination thereof. The sensors 64 may include one or more sensors coupled to each valve, valve adjuster, flow path, atomizer, manual input or control (e.g., trigger) 58, spray applicator (e.g., atomizer) 60, or any combination thereof. The sensors 64 also may be coupled to other parts or locations of the spray tool 38, such as a handle, a head or tip, a side wall, or any combination thereof. Thus, as discussed below, the sensors 64 may sense handling of the spray tool 38 (e.g., touch sensor on the handle), positional data (e.g., positional sensor on the head or tip), movement data (e.g., accelerometer, velocity sensor, directional sensor), or any combination thereof.

As discussed above, the sensors 64 may detect a variety of operational parameters regarding usage of the spray tool 38. For example, the sensors 64 may monitor and collect data corresponding to fluid flow parameters (e.g., flow rate, pressure, and/or velocity), material characteristics of raw materials (e.g., material composition, ratio of materials mixed together, viscosity, density, and/or temperature), usage of the raw materials (e.g., volumes and times of using gas, liquid, and/or solids such as powder), electrical parameters (e.g., voltage, current, and/or grounding of electrostatic system and/or motor driving rotary bell cup), positional and movement information of the spray tool 38 (e.g., relative position between the spray tool 38 and the target object 40, movement, direction of movement, acceleration, and/or any changes thereof), characteristics of powered components, motors, or drives of the spray tool 38 (e.g., rotational speed, rotational acceleration or deceleration, torque, linear speed, linear acceleration or deceleration, operational settings such as high, medium or low, etc.), operational usage of the spray tool 38 (e.g., specific operator using the tool, tool settings during use, duration of usage time, timestamp of specific times of use, frequency of use, and/or number of actuations of controls such as triggers, buttons, or switches), or any combination thereof. The sensors 64 also may monitor and collect data corresponding to air flow problems, fluid flow problems, component problems or wear, or any combination thereof, along with any other parameters disclosed herein. For example, the sensors 64 may detect wear of components, noise and/or vibration indicating problems, drift in operational parameters, or any combination thereof.

The user perceivable outputs 66 may be configured to provide alerts, alarms, messages, or control information to the operator of the spray tool 38. For example, the outputs 66 may include an audio output (e.g., a speaker or audio device that produces beeps, audio messages, etc.), a vibrational output (e.g., a vibrating mechanism), a visual output (e.g., one or more colored lights, LEDs, a textual display, a graphical user interface, etc.), or any combination thereof. As will be appreciated, the outputs 66 may be configured to communicate alerts, alarms, or messages (e.g., instructions, suggestions, or recommendations) from the server 12 to the operator of the spray tool 38 based on analysis of the monitored data, knowledge based data, historical data, computer models, and/or based on certain operational thresholds (e.g., using too much or too little material, trigger pull is too heavy or too light, voltage is too high or too low, distance between spray tool 38 and target object 40 is too far or too close, movement of spray tool 38 is too fast or too slow, etc.). For example, the outputs 66 may light up and/or blink if the distance between the spray tool 38 and the object 40 is too close or too far. For example, the outputs 66 may vibrate if the fluid usage is excessive. Still in another example, the outputs 66 may display a message instructed by the server 12 relating to process improvement or maintenance update.

As such, the operators/technicians may be trained while operating the spray tool 38 based on the feedback generated by the server 12. For example, the operators/technicians may be alerted or reminded every time the operation of the spray tool 38 deviates from the determined optimal condition (e.g., the operator pulls the trigger too frequently, the operator stands too close or too far from the object 40, etc.) From the feedback provided by the server 12, operators in the same or different shops may learn from each other's experience without the need of communication in person. In addition, the operators/technicians may have the most current updates regarding the usage of the spray tool 38 for the purpose of preventative maintenance (e.g., components/subsystems of the spraying system 14 are due for service based on cumulative usage).

The spraying system 14 may include sensors 68 (e.g., thermometer, barometer, hygrometer, etc.) that detect useful information relating to environmental conditions in the service shop (e.g., temperature, humidity, particles/dirt suspended in the air, etc.) Furthermore, the spraying system 14 may also include climate control systems 70 to regulate the environmental conditions in the service shop. For example, the climate control systems 70 may include one or a plurality of fans, air conditioning units, humidifiers, air filtration systems, vacuums, etc. In additional embodiments, the server 12 may adjust the instructions for process improvement according to the detected environmental conditions and/or regulate the environmental conditions via the climate control systems 70.

Figure 3:
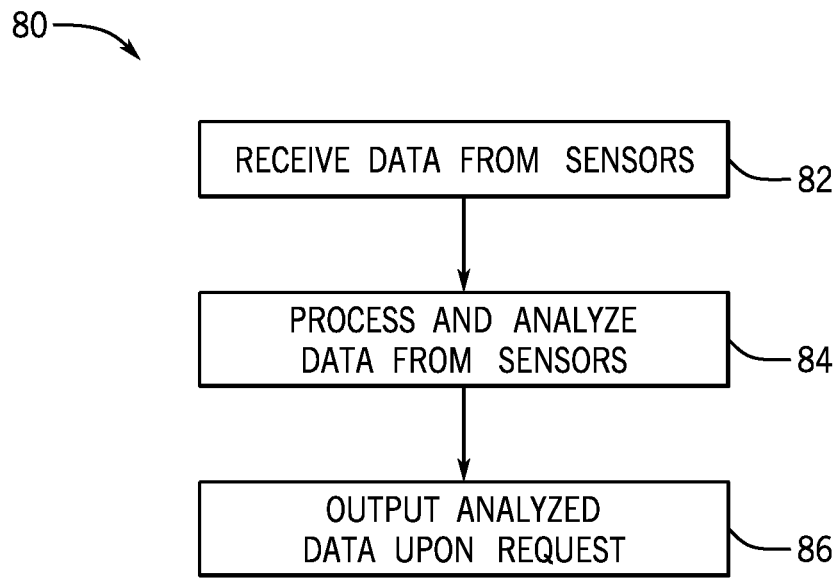
FIG. 3 is a flow chart of a method that may be used by the process communication system of FIG. 1.

FIG. 3 is a flow chart illustrating an embodiment of a method 80 for operating the process communication system 10 in accordance with an aspect of the present disclosure. As illustrated, the method 80 includes receiving data from various sensors, such as any of the sensor feedback and parameters discussed in detail above (block 82). Receiving data in accordance with the acts represented by block 82 may include, for example, collecting data such as fluid flow rate, fluid usage, air flow rate, air usage, distance between the spray tool 38 and the target object 40, motion of the spray tool 38, various operational settings of the spray tool 38, duration of trigger pulls, frequency of trigger pulls, environmental conditions, or any combination thereof, from sensors 50, 56, 64, and 68 of FIG. 2. The collected data may be stored locally at the service shop (e.g., stored in the memory 36 of the controller 32 of FIG. 2), and uploaded to the storage 18 of the server 12 of FIG. 2. The server 12 may be located on site or offsite relative to the spraying system 14.

The illustrated method 80 also includes processing and analyzing data from sensors (block 84). As noted above, many factors may influence the quality of finish for processes (e.g., spray processes) performed at a service shop. For example, different operators may have different techniques and expertise, and some operators may be more experienced than others. For example, as multiple tools and equipment may be used simultaneously by a number of operators, it is difficult to track the tool and equipment usage, condition and maintenance updates. However, there is not always an opportunity to communicate or pass on these techniques and expertise, and information concerning maintenance updates.

In accordance with present embodiment, all of the above mentioned factors may be quantified through data collected by the abovementioned sensors during operation of spray tools. The collected data are processed and analyzed at the controller 32 and/or the server 12 of FIG. 2. In one example, processing and analyzing data from sensors may be organizing the data in terms of different categories and functions (e.g., data relating to spray tool operation conditions by different operators at the same and/or different service shops, data relating to tool/equipment usage and maintenance updates, etc.) In one example, processing and analyzing data from sensors may be determining the correlation between the operation condition of a spray tool (e.g., various data collected via sensors 50, 56, 64, and 68 of FIG. 2) and the spray/paint finishing quality. For example, processing and analyzing data from sensors may involve correlating quality (e.g., finish appearance, finish uniformity, rejected parts, returns, customer complaints, etc.) with operators, operational settings of the spray tools 38, environmental conditions, raw materials, or any combination thereof. Such correlations may be developed using statistical approaches (e.g., Support Vector Machines) for process control and improvement. In another example, processing and analyzing data from sensors may include determining if any components of the spraying system 14 of FIG. 2 need maintenance, service, replacement, refill or update. For example, the data may indicate a declining trending that indicates wear, damage, or poor performance of certain components of the spray tool 38 and associated equipment. By further example, the data may indicate a substantial deviation relative to baseline data, computer models, or other thresholds, thereby indicating a need for service, maintenance, etc. In another example, processing and analyzing data from sensors may involve calculating costs (e.g., monetary costs, labor costs, material costs, etc.) per operator, per task, per product or part, per day, per entire project, per service shop, per crew or team of operators, or any combination thereof. In another example, processing and analyzing data from sensors may involve correlating usage (e.g., air usage, coating material usage, electric power usage, and usage of time) with operators, operational settings of the spray tools 38, environmental conditions, raw materials, or any combination thereof. The usage may indicate a need for improvement based on a comparison with other operators, baseline data, historical data, computer models, and the like.

The illustrated method 80 also includes outputting analyzed data upon request (block 86). For example, authorized personnel may connect to the process communication system 10 at any time to obtain/download the processed and analyzed data from sensors. In certain embodiments, the processed and analyzed data from sensors may be useful feedback from a process improvement stand point for training operators and for maintaining the relating tools/equipment. This may improve the overall operation and process quality control of paint/service shop or shops. For instance, an operator may look up the analyzed correlation between the spray tool operating condition and the spray finishing quality, and use this information to improve the spray practice. For instance, an operator may look up the maintenance update and decide it is time to replace certain components of the spraying system, refill the paint mixer, etc.

Figure 4:
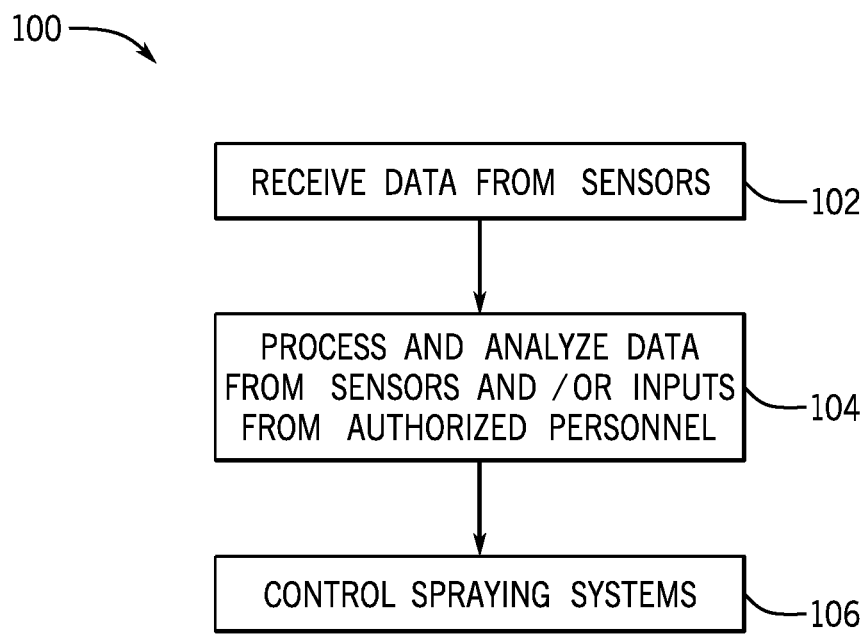
FIG. 4 is a flow chart of another method that may be used by the process communication system of FIG. 1.

FIG. 4 is a flow chart illustrating an embodiment of a method 100 for operating the process communication system 10 in accordance with an aspect of the present disclosure. The method 100 includes receiving data from sensors (block 102) and processing and analyzing data from sensors (block 104) in the same manner as described in method 80. Furthermore, method 100 may also include processing and analyzing inputs from authorized personnel (block 104). For example, in some situations, authorized personnel (operator, manager, maintenance engineer, etc.) may want to provide inputs relating to the spraying system and/or suggestions as to ways to achieve better spray/paint finishing quality. Such inputs and/or suggestions may also be processed and analyzed in addition to data collected from sensors.

The illustrated method 100 also includes controlling spraying systems (block 106). In some situations, based on the processed and analyzed data from sensors and/or inputs from authorized personnel, the process communication system 10 may determine that it would be advantageous to bypass the operator and control a component or components of the spraying system, e.g., the spray tool 38, the fluid source 42, the air source 46, or the climate control system 70. For example, the process communication system 10 may determine to change the temperature, humidity settings, etc. at a service shop. For example, the process communication system 10 may determine that the spray tool 38 is being operated in an improper or imperfect manner, which may result in poor spray/paint finishing quality, excessive use of operator time, excessive use of raw materials, or any combination thereof. Accordingly, the process communication system 10 may bypass the operator and control (e.g., disable, change flow rates, change ratio of materials, speed of rotary atomizer, etc.) the spray tool 38, the fluid source 42, the air source 46, or any related equipment.

Figure 5:
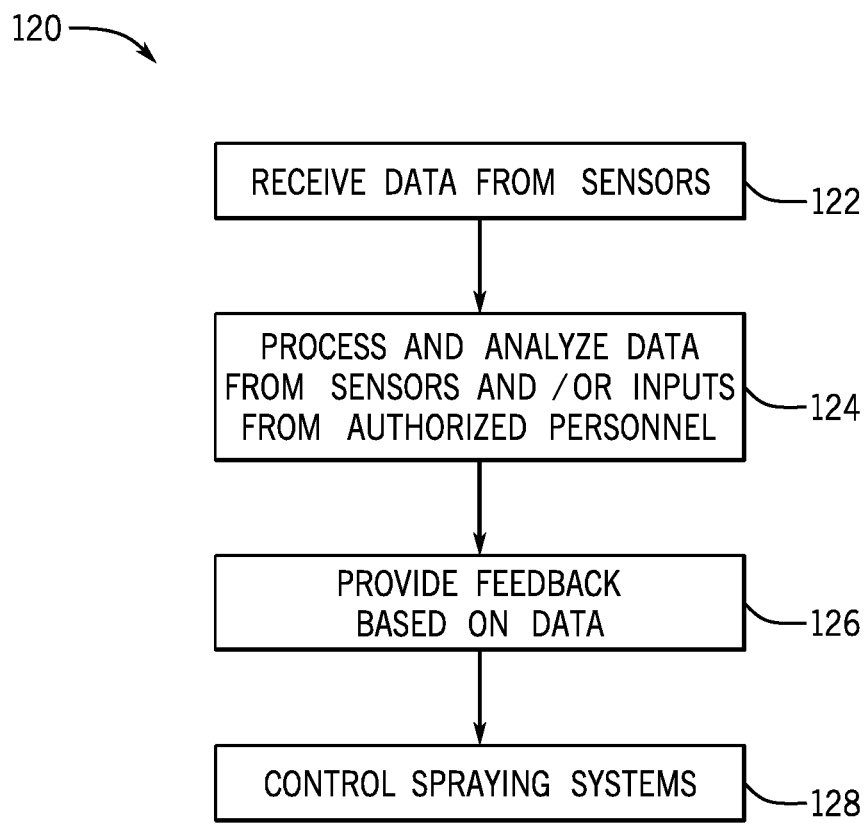
FIG. 5 is a flow chart of still another method that may be used by the process communication system of FIG. 1.

FIG. 5 is a flow chart illustrating an embodiment of a method 120 for operating the process communication system 10 in accordance with an aspect of the present disclosure. The method 120 includes receiving data from sensors (block 122), and processing and analyzing data from sensors and/or inputs from authorized personnel (block 124) in the same manner as noted in method 100. In addition, the method 120 includes providing feedback based on data (block 126) before controlling spraying systems (block 128). As noted above, the present disclosure may be used for painter/operator training and process improvements. In some situations, the process communication system may provide feedback based on processed/analyzed data by outputting an indication via the spray tool 38 in-situ. For example, while operating the spray tool 38, an operator may receive an indication from an output 66 of the spray tool 38, signaling that the spray tool 38 is too close or too far away from the object 40. As another example, the output 66 may indicate that the flow rate (e.g., air, liquid, and/or solid such as powder) is too high or too low, the trigger of the spray tool is being pulled too often, the air pressure is too high or too low, the rotational speed of a rotary atomizer is too high or too low, the voltage of an electrostatic system is too high or too low, the speed of movement of the spray tool 38 is too fast, too slow, or too irregular, the distance of movement of the spray tool 38 is too short or too long, the viscosity of the coating material is too high or too low, or any combination thereof. Based on the in-situ feedback, an operator may make adjustments accordingly and learn to operate the spray tool 38 at conditions suggested by the process communication system 10 based on analyzed data.

As illustrated, the method 120 also includes controlling spraying systems (block 128), which may be done in the same manner as noted in method 100. In some situations, the operator may not be able to adjust the operating condition accordingly in time; therefore, the process communication system may determine to bypass the operator and control component/components of the spraying system concurrently with or after a slight delay (e.g., 5, 10, 15, 20, or 30 seconds) of sending an alert to the operator. For example, if the operator receives an indication from the output 66 signaling that the spray tool 38 is too close to the object 40 but is unable to correctly position the spray tool 38 within a preset time, then the process communication system 10 may take control actions to address that problem (e.g., disable the spray tool 38 and associated equipment). By further example, if the operator receives an indication from the output 66 signaling that the spray tool 38 has an unacceptable flow rate (e.g., air, liquid, or powder) but is unable to correct the problem within a preset time, then the process communication system 10 may take control actions to address that problem (e.g., automatically adjust the flow rates if possible, or disable the spray tool 38 and associated equipment).

The systems and methods disclosed herein provide benefits in time and process improvement in spray service shops. A process communication system provides employees with access to process control and improvement information coupled with intra- and inter-shop spraying systems so they are efficiently communicated with standards of technical operation details and maintenance updates.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a manual tool data system, comprising:
a manual tool data monitoring system configured to monitor at least one operating parameter of one or more manual tools;
a manual tool data acquisition system configured to acquire data corresponding to the at least one operating parameter of the one or more manual tools;
a manual tool data analysis system configured to analyze the data acquired by the manual tool data acquisition system;
a manual tool messaging system configured to generate a message based on the data analyzed by the manual tool data analysis system, wherein the message comprises a suggested operational change for an operator of the one or more manual tools; and
a manual tool override controller configured to adjust operation of the one or more manual tools from a first operating state to a second operating state based on the suggested operational change for the operator.

2. The system of claim 1, wherein the manual tool data system comprises a manual spray tool data system, and the one or more manual tools comprise at least one manual spray tool, a fluid source, an air source, or some combination thereof.

3. The system of claim 1, wherein the at least one operating parameter comprises an air flow rate, a fluid flow rate, an air pressure, a fluid pressure, a ratio of materials, a speed of a rotary atomizer, or some combination thereof.

4. The system of claim 1, wherein the manual tool messaging system is configured to send the suggested operational change to the operator, and wherein the manual tool override controller is configured to adjust the operation of the one or more manual tools from the first operating state to the second operating state when the operator fails to implement the suggested operational change within a preset time after the manual tool messaging system sends the suggested operational change to the operator.

5. The system of claim 4, wherein the preset time comprises a duration of at least five seconds.

6. The system of claim 1, wherein the manual tool messaging system is configured to send the suggested operational change to the operator, and wherein the manual tool override controller is configured to disable the one or more manual tools when the operator fails to implement the suggested operational change within a preset time after the manual tool messaging system sends the suggested operational change to the operator.

7. The system of claim 1, wherein the manual tool data monitoring, acquisition, analysis, and messaging systems are disposed on one or more servers having a processor and memory.

8. The system of claim 1, wherein the manual tool data system comprises a scanner or reader configured to obtain identification data corresponding to a product to be worked upon by the one or more manual tools.

9. The system of claim 1, wherein the manual tool data system comprises an intake terminal configured to input data corresponding to a product to be worked upon by the one or more manual tools, data related to the at least one operating parameter of the one or more manual tools, operator information, or any combination thereof.

10. The system of claim 1, wherein the manual tool data system comprises one or more sensors configured to monitor the one or more manual tools.

11. The system of claim 10, wherein the one or more sensors are configured to monitor one or more manual inputs on the one or more manual tools.

12. The system of claim 11, wherein the one or more manual inputs comprise a manual trigger coupled to at least one valve of the one or more manual tools, wherein the at least one operating parameter comprises a flow rate through the at least one valve, wherein the manual tool override controller is configured to adjust the flow rate through the at least one valve based on the suggested operational change for the operator via controlling a position of the at least one valve.

13. The system of claim 1, wherein the manual tool data monitoring system is configured to monitor environmental conditions, wherein the environmental conditions comprise temperature, pressure, humidity, wind speed, air quality, pollutant levels, or some combination thereof, and wherein the manual tool data acquisition system is configured to acquire data corresponding to the environmental conditions.

14. The system of claim 1, wherein the manual tool data system comprises one or more sensors configured to monitor supporting equipment coupled to or associated with the one or more manual tools.

15. The system of claim 1, comprising at least one tool of the one or more manual tools, wherein the at least one tool comprises:
a spray tool having at least one passage coupled to a spray applicator and at least one manual input configured to control operation of the spray tool;
a sensor coupled to the spray tool; and
communications circuitry coupled to the sensor.

16. The system of claim 15, comprising a scanner coupled to the spray tool.

17. The system of claim 15, wherein the communications circuitry comprises wireless communications circuitry.

18. The system of claim 15, wherein the sensor is coupled to the at least one manual input.

19. The system of claim 18, wherein the at least one manual input comprises a trigger coupled to at least one valve of the spray tool, wherein the trigger is configured to enable, adjust, and disable spraying by the spray tool by adjusting a position of the at least one valve, and wherein the sensor is configured to detect a position of the at least one valve.

20. The system of claim 15, wherein the sensor comprises a flow sensor, a pressure sensor, an accelerometer, a velocity sensor, a directional sensor, or a combination thereof.

21. The system of claim 15, wherein the sensor comprises a position sensor configured to detect a position or distance of the spray tool relative to a target object to be sprayed by the spray tool.

22. The system of claim 15, wherein the manual tool data system comprises a server communicatively coupled to the spray tool via the communications circuitry, wherein the server is configured to acquire additional data from the sensor, analyze the additional data, and provide one or more outputs to the spray tool.

23. The system of claim 13, wherein the manual tool data system comprises a climate control system, wherein the manual tool override controller is configured to output a signal to the climate control system to adjust the environmental conditions at a location of the one or more manual tools based on an analysis of the data corresponding to the environmental conditions performed by the manual tool data analysis system.

24. The system of claim 1, wherein the manual tool data monitoring system is configured to track operator information, wherein the operator information comprises identification, age, experience, term of employment, professional certifications, professional training, educational degrees, or some combination thereof, of the operator, and wherein the manual tool data acquisition system is configured to acquire data corresponding to the operator information.

25. A method, comprising:
monitoring at least one operating parameter of one or more manual tools with a manual tool data monitoring system;
acquiring data corresponding to the at least one operating parameter of the one or more manual tools with a manual tool data acquisition system;
analyzing the data acquired by the manual tool data acquisition system with a manual tool data analysis system;
generating a message based on the data analyzed by the manual tool data analysis system via a manual tool messaging system, wherein the message comprises a suggested operational change for an operator of the one or more manual spray tools; and
overriding manual operation of the one or more manual tools to adjust operation of the one or more manual tools from a first operating state to a second operating state based on the suggested operational change for the operator.

* * * * *